United States Patent [19]

Rosenthal et al.

[11] Patent Number: 5,430,360
[45] Date of Patent: Jul. 4, 1995

[54] MULTIPLE HEAD POSITIONING APPARATUS FOR WOODWORKING MACHINE AND THE LIKE

[75] Inventors: Bruce C. Rosenthal; Kevin L. Zill, both of Sheboygan, Wis.

[73] Assignee: Kohler General Corporation, Sheboygan Falls, Wis.

[21] Appl. No.: 55,864

[22] Filed: Apr. 30, 1993

[51] Int. Cl.6 .................. G05B 19/18; B23P 23/00; B23Q 3/16
[52] U.S. Cl. .................. 318/574; 318/571; 318/652; 29/33 P
[58] Field of Search .................. 318/565, 567, 568.1, 318/568.11, 568.16, 568.17, 568.18, 571, 572, 626, 652, 653, 34, 466, 467, 574, 575, 590; 29/33 R, 561, 38.9, 564, 35.5, 36, 39, 40, 50, 64, 33 P; 144/356, 359, 2 R, 3 R, 3 A, 1 R, 1 G; 192/138; 409/158

[56] References Cited

U.S. PATENT DOCUMENTS

| | | |
|---|---|---|
| 3,987,283 | 10/1976 | Moeller . |
| 4,517,784 | 5/1985 | Beckett . |
| 4,780,951 | 11/1988 | Beyer et al. . |
| 4,874,996 | 10/1989 | Rosenthal ............. 318/567 |
| 4,878,524 | 11/1989 | Rosenthal et al. ............. 144/356 |
| 4,909,112 | 3/1990 | Rosenthal ............. 83/425 |
| 5,219,379 | 6/1993 | Good et al. . |

*Primary Examiner*—Bentsu Ro
*Attorney, Agent, or Firm*—Andrus, Sceales, Starke & Sawall

[57] ABSTRACT

Spaced cutting tools, each having a plurality of linear axes and a rotational axis, are supported with a conveyor carrying successive parts past the tools. The tools include positioning motors and are positioned by a computer driven system including a controller and a tool program for positioning the tools to sequentially cut each part. Separate computer boards each include a memory unit and a CPU for coupling to individual positioning motors for each tool. The controller downloads the program for particular axes to the board for the tools. A positioning sensor is coupled to each tool axes and connected to the computer input for monitoring each tool position. All tools are simultaneously positioned using an initial fast constant speed feed followed by a varying slow speed, with a closed loop control, within a fixed time period. The positioning sensor includes a fixed magneto-strictive rod and a magnet coupled to the tool slide providing an absolute positioning signal, which is compared with a programmed positioned signal to control the feed. For angular tool orientation, a curved sensor rod is used with a correction table which corrects sensor output to an actual angle. The table is generated with a calibrating unit and the magnet applied to the angled positioning motor and stored in the memory unit. Other offset and zero tables are also downloaded from and to the boards for each tool.

20 Claims, 5 Drawing Sheets

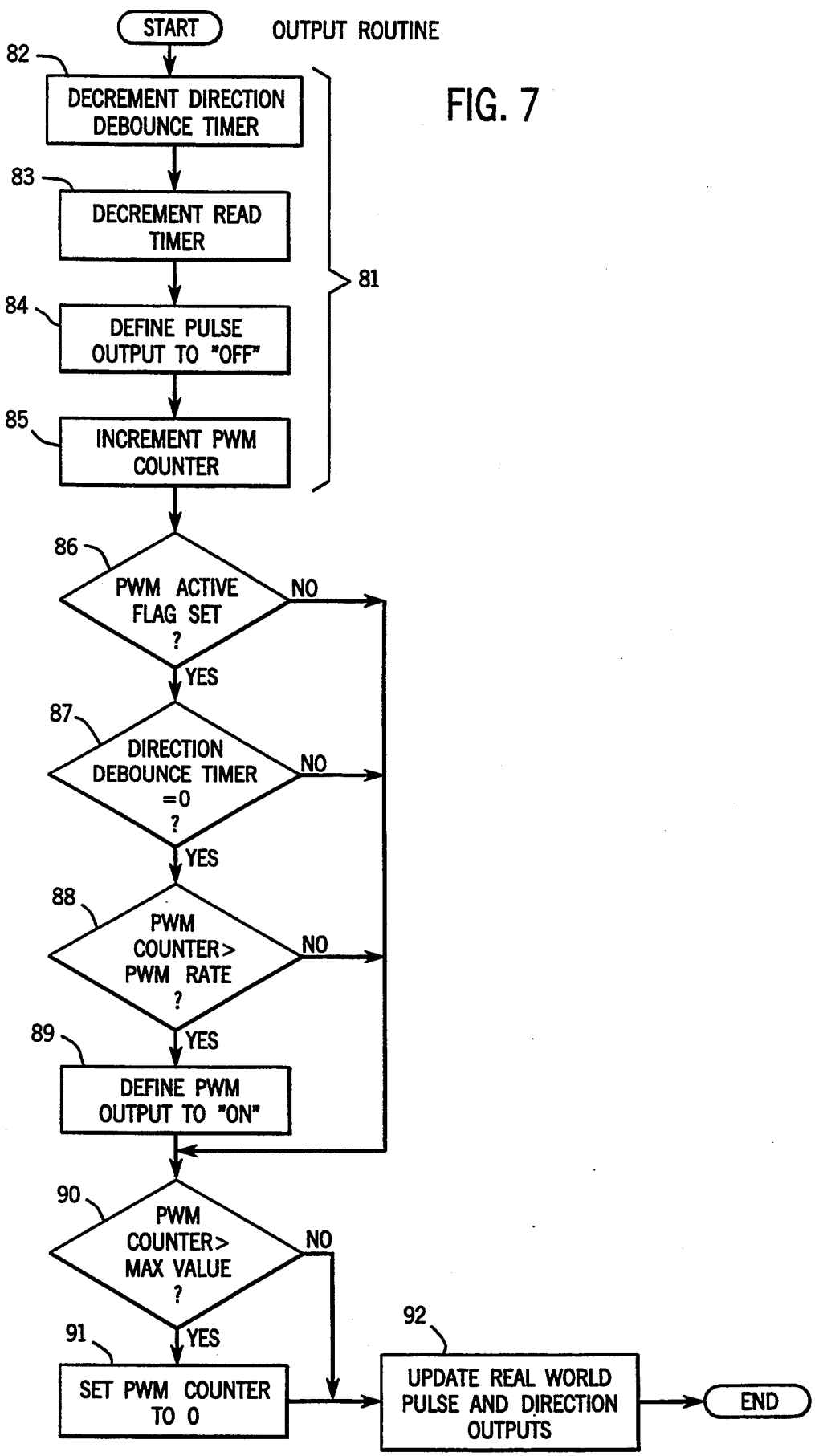

MULTIPLE HEAD POSITIONING APPARATUS FOR WOODWORKING MACHINE AND THE LIKE

BACKGROUND OF THE INVENTION

This invention relates to a multiple head positioning apparatus for woodworking machines and the like.

As more fully disclosed in the present inventor's issued U.S. Pat. No. 4,874,996, woodworking apparatus includes a computer base control unit for the absolute positioning of the multiple tool units which are located and form a part of woodworking apparatus. Woodworking machines are typically high production machinery which include a plurality of different working tools mounted on longitudinally spaced stations. Each tool requires a multiplicity of axes for accurate positioning in accordance with various programmed cuts to be executed on wood members or parts passing through the machine. The cost of the machinery is related to the number of different stations incorporated into the apparatus and, significantly, by the positioning controls for effecting precise positioning of the many tools in space. The above patent is particularly directed to a computer based control unit for absolute positioning control in a relatively rapid and effective manner. Thus for example, the tool units in a relatively large machine are positioned within a time frame of three to eight minutes using the teaching of that patent. Generally that patent discloses a main CPU processor for controlling of the machine. A multiplex receiver board is provided for sequentially positioning of the various tools via a plurality of relay boards. The system includes a capacitive based sensor providing an absolute position control for each axes of the tool positioning apparatus. Each axes is positioned with a high speed movement till it reaches a selected position after which the head is moved in a final slow motion to establish a relatively accurate position. High speed positioning may use a rapid open loop control with all heads moving simultaneously to a rough position. Thereafter, a slow speed motion is established with a closed loop control system, with the tools being sequentially moved to a final position. The slow speed and sequential setting established accurate positioning. As applied to a 50 axes machine, tools may be located in a time frame of three to eight minutes. Other advantageous uses of that system are disclosed.

However, as also disclosed in that patent, there is a continuing need, almost consistently arising, in this type of machinery to further increase the efficiency of the machinery as a result of the unusually high cost associated with multiple head devices. Although three to eight minutes was a significant advance at the time of the prior invention, there is a continuing need to further reduce the setup time, as well as to improve the reliability and to reduce the maintenance and processing of the equipment.

SUMMARY OF THE PRESENT INVENTION

The present invention is directed to improvements in that system which can be applied directly thereto as a retrofit item as well as to other machinery without significantly increasing the cost and simultaneously reducing the time for set-up of the machine without significantly increasing the cost complexity or establishing any other significant limitation on the machine.

The present invention provides an improved tool position sensing system which in combination with a unique processing of the positioning control to establish continuous and simultaneous set-up of the various tools to each final position in a complex machine while maintaining accurate and absolute positioning, The apparatus is readily custom controlled through a friendly operator interface computer system and known durable and reliable control hardware and components which minimizes required maintenance as well as reducing maintenance time and cost. The automation provided by this system may be retrofitted to various machines and particularly that of the inventor's prior invention.

This result has been generated through the realization of the prior art systems technology and the limitations created by even such improved position sensors as disclosed therein and the computer processing system for positioning the tools. Generally, the present invention incorporates improved absolute position sensors, establishes a highly dependable sensing response, with a highly extended life while the processing of the signals and actuating of the head controls is significantly increased in time by providing a special computer based system for simultaneous positioning of the various heads on as many as 50 to 60 axes or more. Generally, in accordance with the present invention, absolute position sensors are provided for each axes. Each position sensor is a magnetostrictive sensing unit including a signal head having an elongated thin, rigid rod member projecting outwardly from the sensing head and a relatively moving sensing member. The sensing unit is mounted in fixed relationship to the machine frame and bed structure with the rod member parallel to an axis of a machine tool. The sensing rod is sealed so as to prevent variations in environments or highly difficult environments which include varying foreign substance such as typically involved with woodworking machinery. A magnetic sensing member is mounted for relative movement with respect to the sensing rod and its position along the rod provides an accurate indication of the relative position of the magnet on the rod. The magnet is a typically simple, annular member with the rod moving through with a significant gap therebetween to produce a center in non-contacting relationship and is therefore also unaffected by the surrounding environmental conditions such as dirt, humidity and the like. The totally non-contact between the sensing elements virtually eliminates wear and provides the extended life which will normally equal at least the anticipated life of woodworking machinery and the like. Very accurate linear measurements are created and can of course be readily used in replacement of other linear sensors such as the previously capacitive sensors.

For angular orientations, applicant has devised a very simple modification wherein the sensor rod is bent to a curvature substantially following the tilting or rotation of the tool. Thus as the tool rotates, the magnet is positioned relative to the curved tube. To provide an accurate sensing precision, formation of a curve tube can of course be costly. Applicant, however, provide a simple bending of the tube and then calibrate sensor unit and particularly the tube position of the magnet on the tube relative to sensed tilting movement of a tool or head. Thus, a data table is generated comparing the actual linear positioning with a precision readout of the position sensing unit. This provides a programmed modification which is applied directly in the commercial application of the machine furnished with the sensor unit. The sensing unit is essentially unaffected by shock and vibration, and are totally electronic without any mechanical wear or other problem presented. The magnetic sensing system provides essentially the ultimate in reliability.

In addition to use of the extended life sensing unit, the individual heads are coupled into a computer based system with a plurality of multiplexing computer units, each of which has a CPU unit dedicated thereto, and a master computer controller for storage of complete part programs. Each multiplexing unit is formed as a multiplexing board with a CPU, associated memory systems and functional input-output devices for simultaneously or individually controlling a plurality of heads. In a practical application, each board can control up to eight axes, with a number of boards applied to a given machine in accordance with the total tools and axes on that machine. Each board has its own central operating or processing (CPU) unit programmed to provide for the reading of the position of the transducer and the outputting of appropriate signals to change the position of the tool and thereby the transducer. Each CPU operates the tool motor to rapidly move the tool until the tool approaches the final programmed position, which preferably includes running to peak speed with continuous tracking of the tool position. The breakpoint is preferably selected such that there is no probability of the tool positioning the overshooting selected tool position. The tool motor is then moved slowly with a closed loop position control to accurately position the tool. The latter movement is set to move the final distance within a selected time period. In this manner, all tools are individually and essentially simultaneously moved, such that when the tool having the longest distance to move reaches its final position the machine should be in condition for operation. The main controller communicates with all boards on a periodic basis to monitor the tool positioning for determining when the machine is in condition for woodworking. The final limitation is that all tools are in final cutting position before the machine can be activated to effect a cutting sequence. The total elapsed time required is thus set by the tool having the longest time to set, that is the tool position requiring the longest time for resetting. This is readily determined. Thus, a maximum set-up time is equal the time for the tool with the maximum axis distance to be positioned in inches divided by the slide speed in inches per second, plus the final fixed time period.

The output of the individual boards for energizing of the motors may use a conventional drive system such as a pulse width control wherein a basic pulse width is created with the initial pulse width set on for a selected percentage of each pulse to move the unit rapidly along the several axes to the final movement position, followed by a lesser percentage of on time during the fixed period for the accurate positioning of the various axes.

The linear absolute positioning system retains its position even in the event of power down in that no batteries or other continuous power supply of any kind is required.

Referencing of the various axes is made on keypad available to the set-up personnel. The information will be inputted and stored in the computer hard drive, which will retain all settings in the event of power loss.

The unique feature resides in the several multiplexing boards, each of which includes a central processing unit and necessary memory units with intelligent input-output ports for the direct positioning of the tools and thereby the position of the tool and the sensor unit, as well as data collection capability, diagnostic programs and signal modifying programs. Thus, the total motor control comes from an individual dedicated multiplexing board for each tool.

Each board thus includes an input-output port for reading the head position, permitting display of the local position, as well as generating speed direction signals. Each board functions as a stand-alone positioning system for a plurality of axes and transducers. Finally, various limited intelligent features for simple and limited analysis of the tool positions as well as limited data collection and providing fixed modification of the drive such as the angulated tilting sensing systems and the like, may be provided at each board. Generally, the main controller is programmed with those controls and functions not related directly to tool positioning. Thus, the zero reference and cutting tool offset will be entered and stored in the main controller via a set-up manual or operator keypad and downloaded with the positioning program. The boards then include appropriate offset and zero reference menus for tuning of the machine.

The special designated boards for controlling the plurality of different axes also reduces the burden on the main controller which can therefore provide various additional functions relating to the operation of the woodworking apparatus. Specially designed part will reside directly in the main central work station controller of the machine, wherein the actual machine cuts may be manually established and each set up saved on an appropriate machine controller memory. Various preventive maintenances will be programmed on the main controller for periodic update. The control system will interlock such that the task must be completed and an appropriate password established before the equipment can continue operation. The present invention thus will not only increase the life of the equipment but will reduce downtime as a result of continuous monitoring of machine operation and appropriate maintenance of the machine. The machine display screen will also permit and display operating and maintenance information providing more speed and ease in obtaining reference information through keyboard entries. In essence, this will eliminate the necessity of manuals and relying on the location and retrieval of such manuals for maintenance and the like. Various additional historical data which has heretofore not been recorded can also be provided as a result of the freeing up of the main computer controller. For example, production data for particular and identified parts and the sequence of operation therefor, number of defects in any given application and the like, can also be recorded by unique coding. Similarly, downtime can be identified by unique codes to thereby provide a better history of the operating efficiency of the machine. Various fine tuning data may also reside in the main controller including offset and zero reference positions, with the data entered by the operator via a keypad.

Thus in operation the main processor controller will carry the program for any particular part. The information for the several axes will be downloaded into the several boards which then proceed as self-contained positioning units for setting and controlling operation of the various heads including reading and updating of the head position, with all heads set to the desired position within a minimal time frame. During operation, each board maintains the related tools in the desired position.

In summary, the present invention provides a significant improvement in the set-up time as well as the reliability of performance of the system and increased data processing power as a result of the various aspects of the invention.

BRIEF DESCRIPTION OF THE DRAWINGS

The drawings herewith illustrate the best mode presently contemplated for carrying out the invention and are described hereinafter.

In the drawings:

FIG. 7 is a flowchart for the initial output routine for the operating program of FIG. 5.

DESCRIPTION OF THE ILLUSTRATED EMBODIMENT

Figure 1:
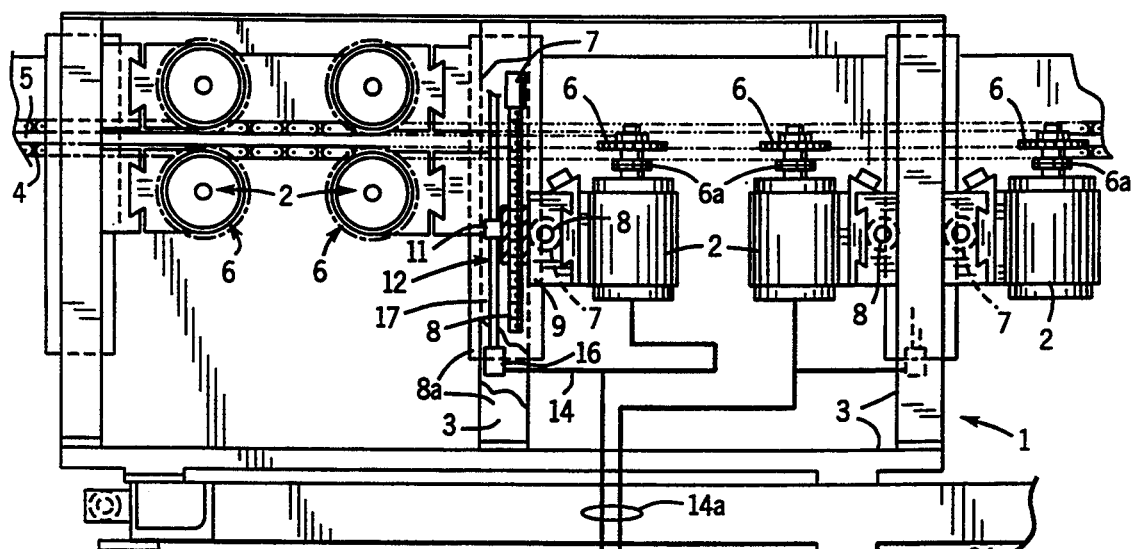
FIG. 1 is a plan diagrammatic and fragmentary view of a woodworking machine incorporating a positioning control system constructed in accordance with the present invention.

Referring to the drawing and particularly to FIG. 1, a multiple tool woodworking machine 1 is shown including a plurality of working and shaping stations 2, generally as in the prior U.S. Pat. 4,874,996. The machine 1 includes an elongated support frame 3 with the stations 2 located in aligned spaced relation along the frame. A conveyor 4 extends throughout the length of the frame 3 and transports successive work or part members or parts 5 in sequence through the several stations 2 and past a working tool 6 provided at each station 2. The conveyor 4 is a known chain-type unit constructed to firmly clamp or otherwise fixedly support part 5 for shaping the edges. In a typical woodworking machine, the sequential tools may require tool movements on a substantial member of axes. for example, a plurality of rotary cutters and other surface working tools 6 are spaced longitudinally of the conveyor 4. In a double ended machine tool, stations are provided to both sides of the conveyor. In a single ended machine, tool stations are provided to one side of the machine. The tool 6 at any station may have a vertical axis, a horizontal axis and a tilt axis for accurate positioning of the tool relative to the work part 5 as the latter moves past the tool. Each axis includes a separate drive motor 7 for separately moving the tool 6 relative to the work conveyor 4 to the desired position for shaping the wood part 5. Generally, each tool will include a compound slide support for vertical positioning on a horizontal axes. A conventional drive for each axis includes a motor-driven screw 8 secured to a machine support structure 8a and a cutting head slide 9 fixed to the tool 6 for linear or tilt positioning of the attached tool. In addition, one or more tools may be mounted for rotational orientation. For purposes of illustration and description, a single linear movement and a single rotational movement is hereinafter shown and described for purposes of simplicity and clarity of explanation.

A linear measuring unit 10 is connected to the cutting head slide 9 and to the machine frame structure 8a. The measuring unit 10 is an absolute electronic scale unit which is used as a direct position of the tool. Each tool axis has a separate measuring unit 10 including a sensing unit 11 affixed to the tool slide 9 and an electronic reading head unit 12 fixedly mounted to the machine frame structure 8a. The head unit 12 is mounted in a precise position relative to the path of the work member 5 past the work station 2 for each tool 6. The position of the sensing unit 11 provides a corresponding readout of its positions relative to conveyor 4. This establishes a direct absolute readout of the position of tool 6. Head unit 12 is an electronic reading device which provides a direct digital readout of the position of the tool 6, and includes a digital display 13 of such position to the operator. The head unit 12 further includes an output cable 14a including a signal line 14 establishing an electrical signal directly proportional to the absolute position reading. The output line 14 connects the part to a microprocessor based positioning control unit 15 providing a logical control for positioning of the various tools 6.

Each measuring unit 10 is of a magnetostrictive sensing construction, and each unit is similarly constructed. The sensing unit is shown and described as commercially available from MTS as a TEMPOSONICS position display system. TEMPOSONICS is the registered trademark of MTS Systems Corporation of Research Triangle Park, N.C. In U.S. Pat. No. 4,909,112, a similar single sensing rod is shown with a plurality of different electromagnets coupled to the single rod. By selective energization of the electromagnets, a single transducer unit provided a plurality of outputs for selectively readout of saw heads on a conveyor bed.

The present invention uses a similar element within essentially a dedicated sensor unit for each axes which in combination with the individual control boards provides a highly effective and rapid means of positioning the various heads.

Figure 2:
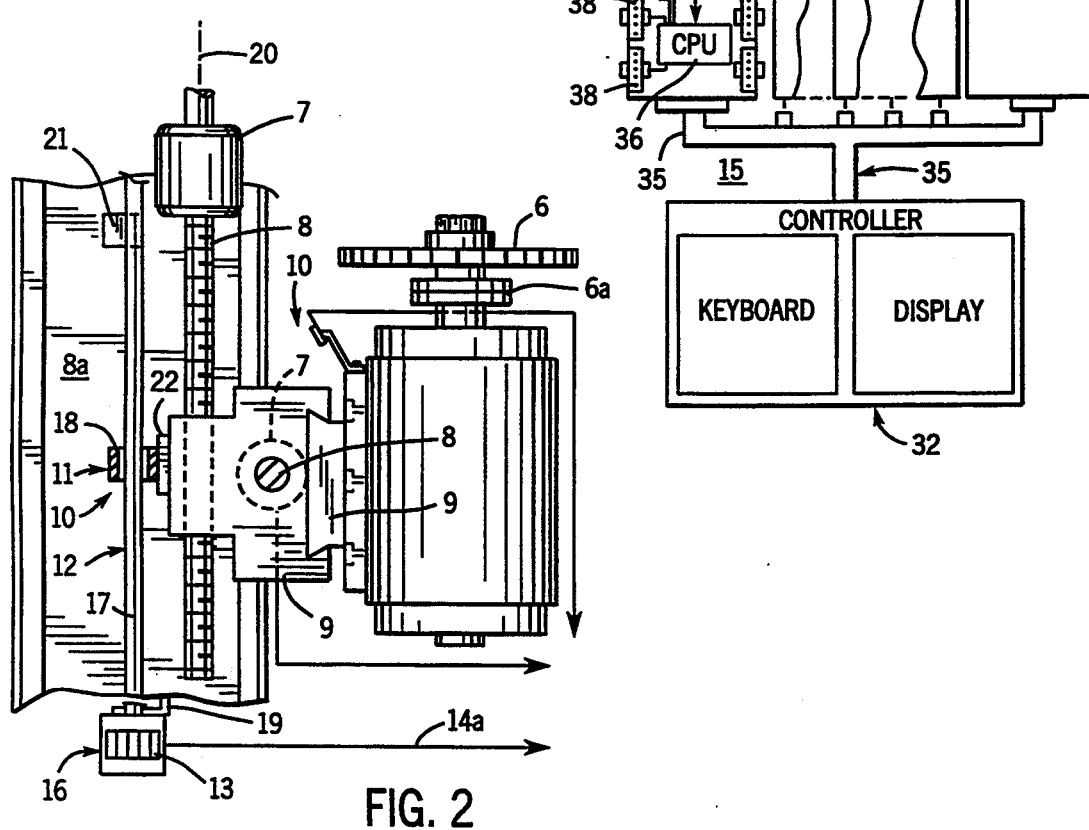
FIG. 2 is an enlarged view showing a horizontal and vertical support for position of a tool and illustrating the position sensor structure of the present inventions.
Figure 3:
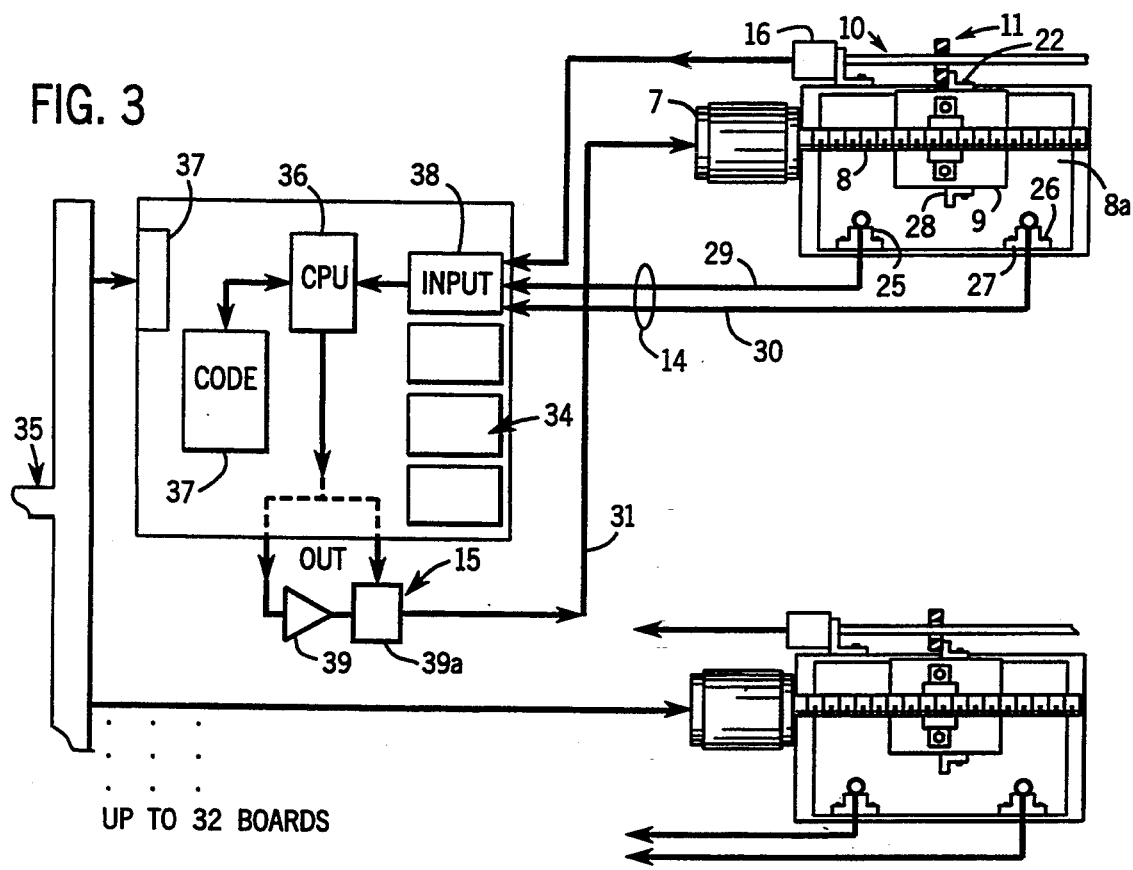
FIG. 3 is an enlarged fragmentary view of the position sensor unit shown in FIGS. 1 and 2 with the computer based control system.

Referencing particularly to FIGS. 2 and 3, the linear measuring unit 10 is illustrated. The head unit 12 includes a head 16 within which an electronic circuit system (not shown) is housed and connected for energizing of an elongated tubular rod 17, extending parallel to the movement of the tool 6. An output signal is created which is directly related to the relative position of the sensing unit 11. The position of a unit 11 controls the signal created within the rod 17 and generates the related electrical output signal directly related to the relative position of the magnet with respect to the rod in an output cable and line 14 from head. In the illustrated embodiment of the invention, the sensing unit 11 includes a permanent magnet unit 18. In practice, an annular non-magnetic (such as aluminum) carrier includes a pair of opposed magnets located with opposing poles to impress a flux field on the rod.

The head 16 is rigidly mounted to the tool support 8a by a bracket 19, with the rod 17 extended in parallel orientation to the movement of the tool along the tool axes 20, and thereby the actual physical movement and position of the tool 6 in parallel relationship to the elongated rod 17. The outer end of rod 17 is secured to the support 8a by a bracket 21. The magnet 18 is mounted in a suitable mount bracket 22, and rigidly affixed to move with the tool slide 9. The relative positioning of the sensing magnet 18 and the rod 17 is such as to cover the maximum movement of the tool with respect to a zero reference position. The system is provided with a zero reset along the entire stroke of the sensing system such that any location can be selected as a zero reference from which to establish movement of the tool.

The diameter of the opening of the annular support unit 22 is slightly larger than the diameter of the rod, which in a practical structure included a gap substantially on the order of 1/16 of an inch. The magnet 18 establishes and maintains a continuously non-contact operative coupling to the rod. The unit has extreme linearity and repeatability of measurements, and may be provided with an integrated visual display 13.

The sensing system includes limit controls to prevent possible movement of the tool beyond certain limits. In the illustrated embodiment of the invention, limit sensing units such as conventional limit switches 25 and 26 are shown mounted by suitable brackets 27 to frame 8a. The limit switch operator 28 is coupled to the movable slide 9 and engages the respective switches at a forward and retracted position respectively of the slide movement. The switches are connected to the control unit 15 via lines 29 and 30 of cable 14.

A line 31 from the control unit 15 controls energization of the motor to provide a closed loop system for accurate positioning of the motor.

The control unit 15 is specially constructed in accordance with the present invention to provide a dedicated positioning computer system for the several motors 7. Thus, as in the prior structure, the control unit 15 will include a main computer controller 32 establishing a main over-control for the woodworking apparatus. Controller 32 will thus include a main programming computer within which separate programs for positioning of the various tools can be created and stored, for each individual part. In addition, the main computer will include the various master controls for initiating operation of the machine upon proper set-up of the machine, various updates of the system, other continuous monitoring of the machine during set-up and actual part working, and the like. The central controller 32 does not, however, directly control tool positioning, but rather, will communicate with a plurality of multiplexing tool positioning boards 34 via a main communication cable 35. Each of the control boards 34 is specially constructed as a self-contained tool positioning unit. Each board 34 includes a central processing unit 36 and a plurality of memory units 37. The memory units are adapted to receive coded data information in the ram memory of the board memory from the central station controller 32 identifying and establishing a set of data for appropriate movement of the various axes of a tool 6 by execution of the operating program in the memory unit. In actual practice, each program is downloaded into memory unit 37 and includes the necessary code for all axes of at least one tool 6. In a practical application, each board was constructed to control up to 8 pair as presently described.

Each tool slide generally is constructed with the mount unit 6a to receive different tool 6 related to the particular cut or work to be completed at that particular work station on each work member or part. The tool slide has a reference position in relationship to the mounting of the measuring unit 10 and particularly the mounted rod 17. Thus, the output of the sensing magnet may generate an output position signal establishing a distance reading when the tool slide is at a zero slide reference. The controller 32 stores the offset table for correcting the output of measuring unit to reflect such offset. In addition, each tool mounting may have a different mount structure 6a which positions the cutting or working part of the tool 6 at a different distance relative to the slide's zero reference. A table or menu for the particular tool is thus also provided. The program menus or tables are stored in the controller 32 and downloaded to the proper board as part of the part program. Thus, the system has a zero reset feature, such that any locations can be selected as the zero reference from which the tool movement is set. The offset and zero references are directly inputted to controller using a keypad unit, not shown, in accordance with known structure and system for building modifying program tables.

Thus, in practice, each of the individual boards 34 is coupled via the cable 35 to the central unit and the appropriate programs for the related tools 6 is downloaded into memory unit 37. Thereafter, each of the boards 34 functions essentially as a stand-alone unit to position the slides and the tool 6 in the desired position. In addition, each board communicates with the central controller to signal the status of the tool positioning and the final positioning of the tools by the central processing unit 36 in the desired operative position. The central controller would then await corresponding information from all of the boards 34 before activating machine operation.

More particularly, each circuit board 34 has a plurality of input/output ports 38, each controlling one of the various axes of a tool 6 and for sensing of the position of the tool as well as energizing of the motor 7 for positioning of the various slides. Each input/output port 38 provides an intelligent interface to the tool unit not only for positioning but for other types of inter-related control.

More particularly, the output of the measuring unit 11 and the limit switches are coupled as inputs to the board 34. The dedicated central processing unit 36 (CPU) will simultaneously detect the position of the tool relative to a programmed position and simultaneously energize the several motors for simultaneous movement of the various slide supports of the tool to provide the simultaneous movement in space of the tool toward its final position.

As previously noted, the CPU 36 can provide a pulse-type signal for energizing of the motor 7 at a high speed or alternately at a low speed. In addition, the output of the CPU will control the direction of the motor rotation and thereby the direction of the slide. Thus, the direction of the screw rotation will control the directional forward and retraction movement of the slide and the related tool. In particular, the output of the processing unit 36 generates a pulse signal which is amplified as by amplifier 39 and then passed through a direction control unit 39a for controlling the operation of the motor 7 and the positioning of the slide and tool. Control unit 39a may be a simple two-position relay switch activated by the program to establish forward or reverse direction. In the subsequent description, the switch "on" position operates motor 7 in one direction and the switch "off" position in the opposite direction. Simultaneously with such movement, the measuring unit 10 will transmit a signal of the actual position. The central processing unit 36 will continue to energize the motor 7 at a fast speed until the sensing unit generates a signal which spaces the tool from its final position by a predetermined distance. At that time, the central processing unit 36 will automatically convert the motor drive to a slow speed mode and establish a different pulse signal for driving the motor and moving of the tool at a relatively slow speed.

In this latter motion, the position output signal is continuously monitored and compared to a final position signal in a closed loop servo system. This establishes the desired accurate positioning of the tool. Thus, as previously noted, the circuit board functions as a self-contained positioning unit with a special operating code and the inter-related information switch with the information received from the central unit constitutes a self-contained tool positioning unit or system.

The downloading of the program into several control boards can, of course, be established almost instantaneously through the communication from the main controller to all boards 34. Each of the boards, upon receiving of the appropriate information, can initiate the positioning of its tool or tools. When the initiation is completed, a signal is transmitted back to the controller 32 indicating the setting of the particular tool in its final position. When all boards have so informed the central unit, the woodworking machine can be activated for operation whereupon the several parts can be placed on the conveyor for sequential movement through the woodworking apparatus.

The total time to set all of the tools is equal to the time to set the single tool having the greatest motion to the final set position. Thus, with the high speed movement moving to a set position spaced from the final position, and with that final step of equal length for all tools, the maximum time will be equal to the total high speed time for moving to such fixed position, divided by the motor speed, plus the final fixed time. In equation form this would read as follows:

$$\frac{\text{Total distance less fixed final position distance (in inches)}}{\text{Fast motor speed in inches per second}} + \text{substantially final position time}$$

In a practical application, the fast motor speed was substantially 0.05 inches per second and the final move time was substantially a few seconds. These times may be significantly reduced by refinement in component selection and manufacturing tolerances without significant increases in cost. Thus, the multiple boards with the separate central processing units provides a significant improvement in the time requirement for setting of the various tools in the necessary position.

The invention anticipates reducing the setup to a minute or less by use of proper tool supports and drives, and orders of 15 seconds are eventually anticipated using the present computer design. The measuring unit 11, which has been shown and described, provides an optimum sensing unit in view of the reliability and ruggedness of the unit. Any other unit, of course, providing the necessary reliability and response, can be also be used within the board aspects of this invention.

As previously noted, certain structures may require angular orientation. With the illustrated measuring unit, a simple, reliable and low cost construction of the TEMPOSONIC position display unit is illustrated in FIG. 4.

Figure 4:
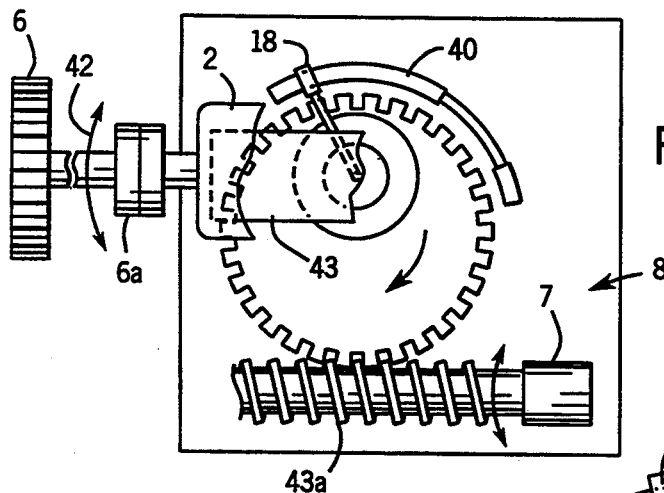
FIG. 4 is a view illustrating a rotating tool position drive and sensor for a tool unit shown in FIG. 1.
Figure 5:
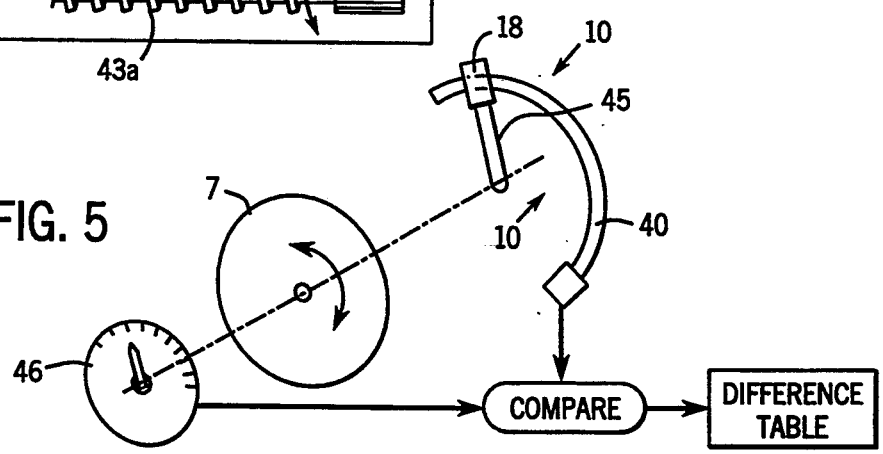
FIG. 5 is a diagrammatic view of a calibrating system for an angular tool position sensor.

The inventor modified the linear rod structure to provide an arcuate rod 40 as shown in FIG. 4. The radius of the rod 40 substantially corresponded to the radial axis 42 of movement for the rotationally mounted tool 6 of FIG. 4. The measuring magnet 18 is again secured to the slide support 43, with the arcuate rod 40 appropriately located adjacent to the rotating slide. The magnet 18 is secured to the rotating slide attached directly to the tool 6. When the tool 6 is rotated by the position motor 7 to angularly position the tool relation to the work 5, the magnet 18 thus travels along the angular location of the rod 40 and provides a signal related to the angular position of the magnet 18 and therefore the angular location of the tool 6. Thus, motor 7 is connected to rotate the magnet by a worm and worm gear unit 43a. The signal generated and transmitted from the head 16 to the multiplex board 34 is accurate to the extent that the rod 40 has a radius which tracks the actual radius of the tool movement. In accordance with the illustrated embodiment, memory unit 37 is provided with a conversion program for this particular tool motor such that the output of the measuring unit is adjusted to produce an accurate position signal for appropriate processing and control of the head structure. Forming of the rod 40 in a precise manner with appropriate mounting and the like will provide a precise track and angular readout. However, such a system would be relatively expensive. The inventor developed a system whereby the curved rod 40 is formed from the straight rods of the linear measuring unit by bending using a conventional bending machine to establish a relatively constant radius. However, high precision is not demanded. Rather, the measuring unit 10 is calibrated as diagrammatically shown in FIG. 5. The angle measuring unit 10 is connected to a rotating slide 45, with a calibrating angle measuring unit 46 secured directly to the motor 7. Readings are then made of the measuring unit 10 and the calibrating unit 46 for every unit of measurement along the rod 40, for example, every 1 degree of rotation. The readouts of the two units 10 and 46 are then compared to detect and record the difference in the readout of the measuring unit 10 and the calibrating unit 46. An offset or correction program table is generated with a correction or modification factor for each position of the magnet sensing unit 18. Such programmed table is a part of the program stored in the controller and downloaded as an element of the part program in the memory unit 37 of the multiplex board 34. During the rotation of the tool 6, the actual reading from unit 11 is then continuously modified by the board resident computer program in accordance with the position in the programmed table. This, again, provides accurate and rapid reading of the absolute angular position of the tool, with corresponding high speed positioning of the tool during the initial set-up of the apparatus.

The measurements are made at discrete steps and a data table generated with such information. The readings taken during tool positioning are then modified, if necessary. Thus, the resolution of the system may permit adjusting each reading directly to the closest reading established by the data table. If further linearity is necessary, the CPU is programmed to interpolate the change between the data points in the table within which the actual reading falls, and the interpolated correction made to the actual reading.

For example, in one practical application the calibrating reading was taken every 5 degrees, when the reading during set-up was between the two readings, an interpolation program was calculated to find the adjustments. The interpolation was based on an assumed linearity between the two points. The reading much points 0.1 degree, but the memory will have to be that much greater. A reasonable compromise can be made depending upon the required or desired accuracy. The software program can be readily provided by those skilled in the art. A flowchart of a satisfactory program is shown in FIGS. 6 and 7.

Figure 6:
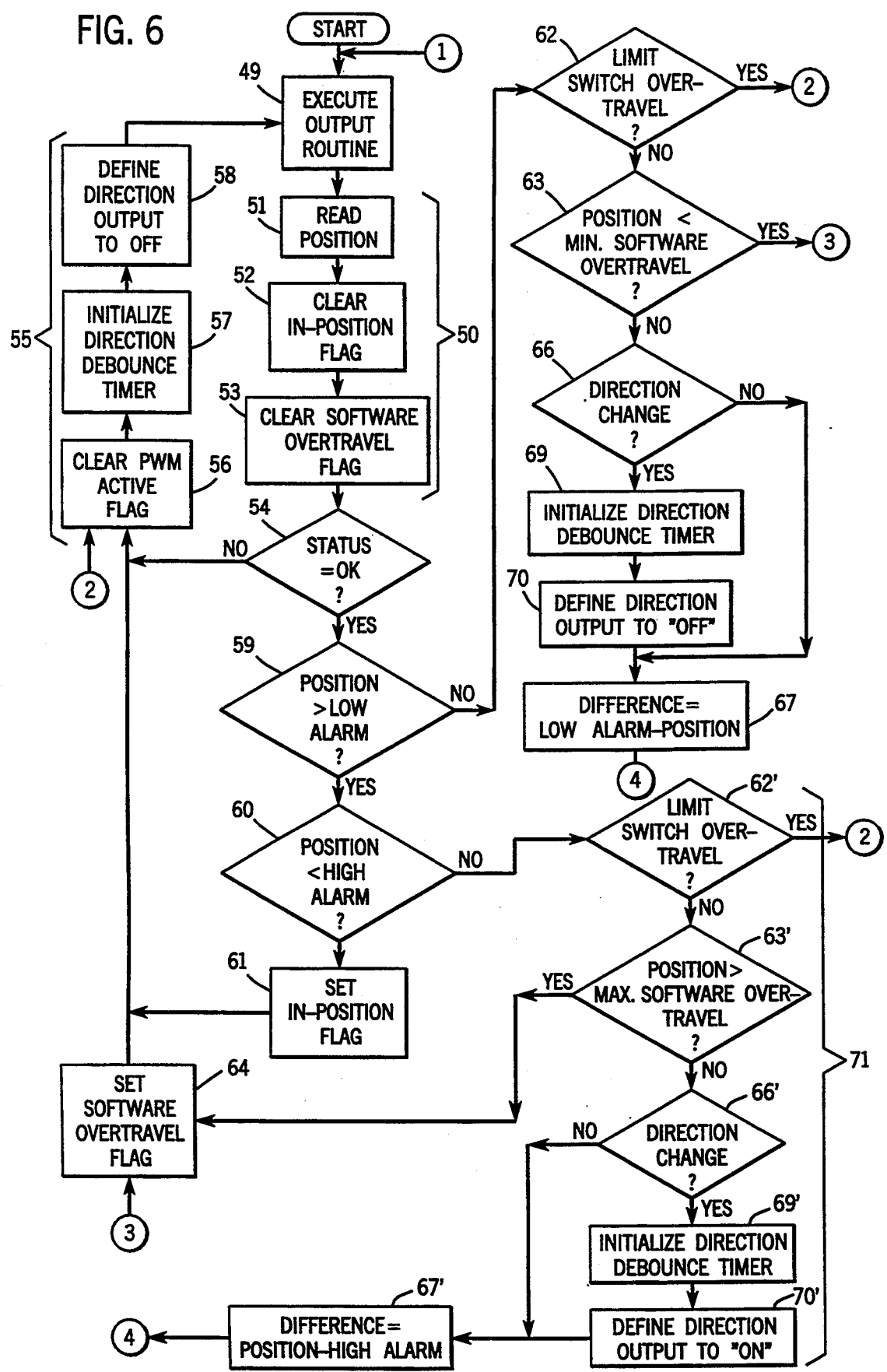
FIGS. 6 and 6a is a flowchart of the program for positioning a tool.

Referring to FIG. 6, a tool set program flow-chart for executing the downloaded program for a tool is illustrated. The start signal may be received from the controller or initiated by the operator. The program is shown executing an output routine at 49 followed by a series of housekeeping steps 50. The output routine 49 is shown in FIG. 7 and establishes the update drive for the motor although shown as a first step, the routine may be executed at any time within the program shown in FIG. 6; as the result of an interrupt generated by the tool positioning program. Thus, the output routine is repeated on a time spaced basis to produce an apparent continuous pulsed signal to the motor 7. The housekeeping steps 50 of the program include reading the present tool position 51, clearing the in-positions flag 52, which indicates the tool is in the final position, and the software overtravel flag 53, which indicates the tool positions exceeds specified limits. The program then steps to check if the program status 54 created is proven, that is whether the read position is within system readings. The controller 32 interrogatories all boards on a periodic basis to monitor the status of tool drive and the tool position. The controller cable 35 is a four wire coupling, and the controller initiates and controls all communication with the boards. Thus, if the reading function at step 51 was not properly read, the controller would respond and take such corrective action as necessary, such as creating a visual output or even stop the system operation. The controller 32 will, of course, also detect any other condition requiring action, such as hereinafter described. If not, an additional series of reset steps 55 is necessitated to recycle the program, including clearing the pulse width modulator (PWM) active flag 56, initialize the direction denounce timer 57, and set the direction output to off 58. The PWM active flag is reset, which directs a part of the output routine 49, as hereinafter described. The debounce timer is initialized 57. The debounce timer is a counter which removes power from the direction switch 39 so that switching only occurs under zero current state. The debounce counter is sequentially reset by the output routine, as hereinafter described. The step 58 turns the direction control to off, as a reference direction. Thus, the system is reset to remove drive and initiate a new program cycle. At completion of the correction sequence, the program is again cycled, starting with the previously described step 49 and sequence 51 to the status check step.

With a status checked "yes" at point 54, the program steps to check the present position of the tool. At decision step 59, the program determines whether the tool position is greater than a low alarm position. If the tool position is greater than the low alarm setting, the program steps to a high alarm decision step 60 and if within such limit, the tool is on the desired position and the program sets the in-position flag 61 and recycles through the program steps 55. Thus, the alarm limits define the plus and minus tolerances programmed into the acceptable position of a tool. If a tool position is nominally 10, the actual acceptable position may vary by ±0.002, or 9.998 and 10.002. If within that range, the position is in its final position and "in-position flag" is set at 61, and the program for that tool steps to recycle the program through the previously described sequence.

Figure 6A:
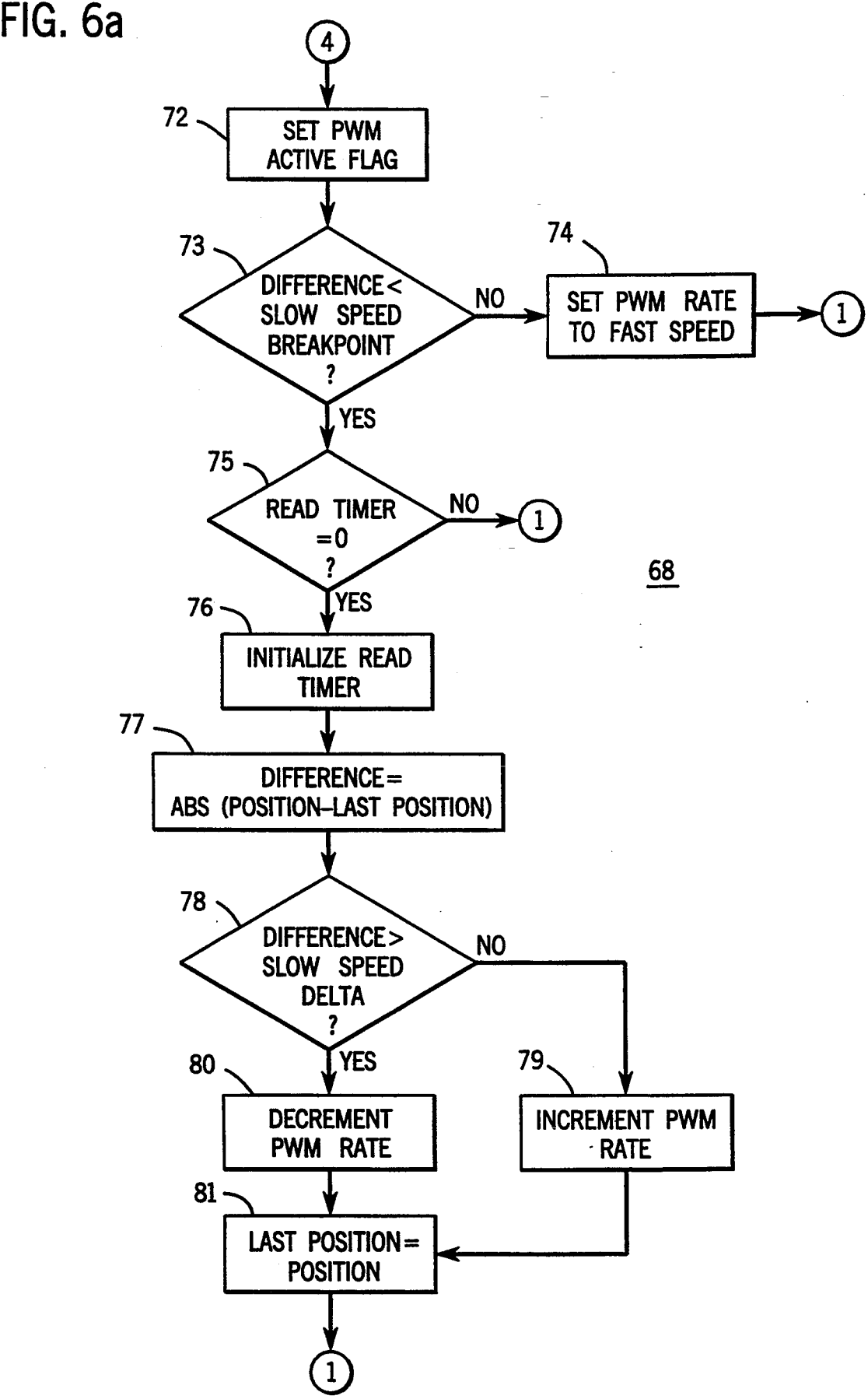

If at the low alarm step 59 the position is not greater than low alarm position, the tool is not within the final position and the program steps to determine whether the overtravel limit switch 25 has been activated as at 62. If yes, the program recycles to the reset sequence 55. In the event of overtravel, the controller 32 at a periodic interrogation, detects and responds to the fault, such as by flashing an error message on an appropriate display. This will indicate to the operator that some corrective action may be necessary, and may require shutdown of the system. If not, the program steps to compare the position with a minimum software programmed overtravel at 63. The system thus establishes a redundant main limit control, in the event of a hardware malfunction. If yes, the program steps to set a software overtravel flag as shown at 64 and then executes the reset program sequence 55. If at step 63, the position is not less than the software programmed overtravel, the program steps to a direction change decision 66. If no change is required, the program steps to set the difference equal to the high alarm position at 67 and steps through the motor speed control sequence 68 (FIG. 6a). If a direction change is required at step 66, the program executes a change sequence including initializing the direction denounce timer 69 and then setting the direction output to off 70 with switching under zero current conditions, and then steps to the high alarm-position set 67.

A similar sequence of steps is executed corresponding to step 62 through 67, if at decision 59 the program steps to decision 60 and the position is not less than the high alarm, shown at sequence 71. The steps of sequence 71 are identified by primed numbers, corresponding to the prior described sequence 62 through 67. The output of sequence 71 similarly activates the motor speed sequence 68, but with an opposite direction change at step 70$^1$ if a change is required.

In the motor drive speed sequence 68 (68a), the program first sets the PWM active flag as at 72 and then determines whether the tool position is less than the slow speed breakpoint at 73. The breakpoint is the position at which the slow speed mode is to be implemented, and is set at step 67 or 67$^1$. If not, the PWM rate is set to the high speed at 74 and the program steps to the start position or point of the program. The PWM rate is set through a fixed maximum pulse signal and a counter which is set to establish a first percentage of such pulse signal for the fast rate, as hereinafter described. The high speed movement is preferably the peak motor speed, and the program continuously monitors the position and sits at point 51 the fast speed at point 75 until the break point to slow speed is reached. The breakpoint is selected relative to the peak speed such that the inertia of the tool does not result in movement beyond the desired tool final sitpoint. In a practical application the fast speed energization level was set to be substantially 99 percent of the total pulse width.

If the position is less than the slow speed set point, the timer output is read at 75 to determine whether a zero reading is reached. The slow speed system is programmed to operate for a substantially fixed time period for driving the motor at a slow speed, which may be on the order of a few quarter seconds with speed adjustment every second. The final slow movement may also be varied with the advance of slow movement time, such that the speed is reduced in proportion to the elapsed time during the slow movement period. The slow speed timer is also a counter which is reset by the output routine, as hereinafter described. If not at zero, the motor is moving at the previous speed and the program recycles. If the timer is at zero, the read timer is again initialized at 76 to initiate a new time period. The absolute difference is set equal to the present position relative to the last position, at 77. The difference is compared to the slow speed delta at step 78, that is, a selected portion of fixed distance for slow speed travel from the breakpoint position to the final position. The delta speed is related to the difference position and the setting of the read counter to zero. As subsequently described, the slow speed timer (counter) is decremented for each execution of output routine, which as previously described, is executed in a fixed timed sequence in response to equal time spaced output routine interrupts. Thus, when a zero reading is set, a fixed time expired and the distance moved in that time period is known from step 77. If such difference is greater than the required distance, the speed rate is decremented, and if not, the speed rate is incremented. For example, read timer maybe reset to a count of two seconds based on the repetitive cycling of the output routine. When in the slow speed mode, the read timer is activated during each incrementing thereof. This might be each one quarter second. The actual travel or difference calculated at point 77 is then compared with the program distance which should have been traveled, and the PWM rate incremented or decremented to increase or decrease the speed and compensate for the variation. Over the period of slow movement and the inevitable acquired corrections, the system insures rapid and accurate positioning within the final fixed drive period. In particular, if the difference is less than the slow speed delta time, the PWM rate is increased at 79 and if greater, the PWM rate is decreased at 80. Thus, the speed is varied slightly as the tool approached the final position. From either step 79 or 80, the program sets the last position to the present position at 81. At step 77, in the next cycle, the next change in position appears at 78. The system recycles to the start of the program to create the next cycle.

Referring to FIG. 7, a flowchart for the output routine 49 of FIG. 6 is shown. Upon start of the routine, the program is set by a sequence as at 81, with the direction debounce timer and the read timer decremented as shown at 82 and 83. Thus, each timer-counter is initialized whenever a direction change is required, or during the recycle sequence 55. In the latter sequence, the reset only is created with PWM flag cleared. The pulse output is defined to the off-state at 84 as a reference and the pulse width counter is incremented as at 85. After completing such housekeeping sequence, the determination is made as to whether or not the PWM active flag has been set, as at 86. The flag is set at point 72 of the operational flow chart of FIG. 6 unless cleared at point 57 of recycle sequence 55. If the flag is set, the program steps to determine whether the direction debounce timer is zero, as at point 87. If it is at zero, a check at point 88 is made to determine whether the pulse width counter is greater than the existing pulse PWM rate. Again, if the counter is at a greater rate, the PWM output is defined, as at 89, as being "on". If at any of the above decision steps a "no" state is noted, the program steps directly to the step 89, defining of the PWM output to an "on" state. Thereafter, the program steps at 90 to determine whether the counter is greater than maximum value. If it is, the PWM counter is reset to zero at 91 and the program steps to the update function 92. If the counter value is not above maximum, the program steps directly to the update position and function 92. The update function sets the pulse and therefore speed and direction signal output, terminating the output routine.

At the update step, the actual change in the speed and the output direction is executed, as a result of the previous program execution which included setting or defining of the direction, setting of the PWM rate to the fixed fast speed; or incrementing or decrementing of the PWM rate if in the slow speed mode. At the time of update, the direction debounce timer or counter is set and the pulse output is instantaneously cutoff through use of a solid state switch the direction switch then has ample time to change its state, if necessary, before power is again applied to it.

In the program established, the initial portions can be simultaneously applied to all axes, with the final processing sequence separately executed for each axes. Thus referring to the output flow chart of FIG. 7, the sequence 81 can be common to all axes while the following sequence which sets the values for the particular axii is separately executed for each axes. Similarly, regarding the operation flow chart of FIG. 6, the portion including step 54 and the preceeding steps of sequences 50 and 51 can be simultaneously executed for all axes, while the remaining sequences are executed for each axes.

In addition, upon completion of the tool setting, the controller on interrogation of the boards receives completion signals indicating the completion of all settings for the tool in its final position. The controller, upon receiving signals from all tools or tool setting programs from the muxboards, enables the woodworking machine for operation, either directly or under the manual control of the machine operator. The system also provides for setting of the tools in a precise previous position in order to insure a high degree of set-up repeatability. Thus, as described, each tool is programmed for two spaced positions, with a zero indicator at each limit. the programmed control will alternately move the tool between such limits a plurality of time such as ten times with repeated reading within the plus and minus tolerance for the tool setting.

Although particular drive and control components and elements as well as a particular program have been described in the illustrated embodiment, the system may include other components, elements and programs within the teaching presented herein. The drive motors may be stepping motors or A.C. motors. The power supply may be other than a pulse width modulated supply and other programs may produce the functional control provided in the illustrated embodiment of the invention. In summary, the present invention, in its broadest aspect, is directed to the multiple control boards, each of which has a central processing unit, and the use of such multiple boards for simultaneous and rapid setting of the multiple axes of a multiplicity of tools in a woodworking machine or the like. The illustrated embodiment is a preferred and unique system which has created an improved commercially operable woodworking machine with a reduced setup stencil as well as an enhanced overall machine operation without significant cost increases.

The positioning motors 7 can be simple, permanent magnet motors as disclosed in the above entitled application or low cost alternating current motors can be used with the absolute positioning system.

Significantly, the total system provides for most high speed setup of the woodworking machine with its multiple heads without the use of a costly servo system which requires costly servo motors with sophisticated amplification and loop circuits to produce a high degree of accuracy in the setting of the tool.

Various modes of carrying out the invention are contemplated as being within the scope of the following claims particularly pointing out and distinctly claiming the subject matter which is regarded as the invention.

I claim:

1. A multiple tool working apparatus including a substantial number of tools for sequentially working upon series of work members comprising a conveyor means including support means for fixedly supporting work members to be worked, said conveyor means sequentially moving the support means past a substantial plurality of longitudinally spaced tools, support structure holding each of said tools in position for movement on a plurality of axes including linear axes and including a separate drive motor unit for each tool, motors coupled to said tools for moving and positioning of said tools along each tool axis for alignment with a portion of the work members to be worked, a measuring unit mounted to said support structure for each tool axis and including a readout unit and a relatively moveable position sensing unit coupled to said tool and moving therewith relative to said readout unit and thereby establishing position signals of the corresponding tool along each axis, a multiplexing control board system for controlling of said motors, said board system including a plurality of multiplexing boards, each said board including a computer processing unit and a memory system secured to each board and having a plurality of input-output units for controlling a plurality of said tool motors, a central computer controller adapted to store information related to said work members and operable to load said memory systems with data for the tool positions for the plurality of tools, said computer processing units of said multiplexing boards operating simultaneously to simultaneously energize all of said motors whereby the set-up time for positioning of all said tools is controlled by the tool having the greatest positioning requirements.

2. The apparatus of claim 1 wherein said processing units energize said motors at a fast speed during a first period and at a slow speed during a subsequent second period, simultaneously energizing all of said motors whereby the set-up time for positioning of all said tools is controlled by the tool having the greatest positioning requirements.

3. The apparatus of claim 1 wherein each measuring unit is an absolute position sensing unit.

4. The apparatus of claim 3 wherein all of said motors are simultaneously energized for a first time period of a high continuous speed and a second predetermined period related to a final distance to be moved to the tool position, and said processing units energizing said motors at a significantly lower speed during said second period.

5. The apparatus of claim 4 wherein said measuring unit includes limit switches having outputs defining the maximum authorized movement of said tools.

6. The apparatus of claim 5 wherein said computer processing unit includes programmed tolerance limits of authorized movement.

7. The apparatus of claim 6 wherein said processing unit executes a program including an operating routine for establishing the speed and direction for engerizing each of said motors, said program sequentially monitoring the tool position within said programmed limits and said limit switch and outputs, and thereby determining the necessity for any direction change, said program proceeding to determine the actual motor speed compared to said first period and said second period and maintaining said high speed until detecting the termination of said first period and thereafter establishing a sequence to continuously determine incremental movements in accordance with incremental time periods and varying of said speed to establish an essential fixed movement per increment of time and thereby accurately positioning of said tool in a final position.

8. The apparatus of claim 7 wherein said operating program includes an output routine for periodically executing an update program for updating said operating routine program for energizing of said motors in accordance with the output of said operating routine.

9. The apparatus of claim 7 wherein said absolute positioning sensing unit includes an elongated signal rod, said tool being angularly oriented, said rod having a curvature substantially corresponding to the radius of the angular orientation of said tool, said sensing unit moving on said rod and establishing an output signal generally related to the position of said sensing unit on said rod, said program including a correction table related to the angular orientation of said tool and the output of said sensing unit and modifying the output signal of said sensing unit in accordance with any difference in the output from an output precisely related to the angular orientation of said tool.

10. The apparatus of claim 9 wherein said tool is mounted in a rotating bearing structure, a worm gear coupled to said rotating bearing structure, a worm coupled to rotate said worm gear and establish corresponding angular orientation of said tool, said curved rod being secured in fixed relation relative to said worm gear and concentrically located with respect thereto, said sensing unit being coupled to said tool support structure and moving with said movement of said tool for corresponding position on said curved rod and thereby being positioned substantially in accordance with the same angular orientation on said rod as the angular orientation of said tool with respect to said rod.

11. The apparatus of claim 3 wherein said controller continuously establishes communication with each said board to monitor the status of each tool axis.

12. The apparatus of claim 3 wherein each said measuring unit is a magnetostrictive structure including a support head and an elongated rod projecting outwardly from said head, said rod corresponding to and being located in parallel relationship to the axis of the tool, a magnetic unit secured to said tool and moving therewith, said magnetic unit coupled to said rod and generating an output signal in said rod precisely related to the absolute position of the magnetic unit on the rod and thereby the position of the tool relative to the fixed position of the rod.

13. The apparatus of claim 12 wherein said output signal is an electrical signal having an amplitude directly related to the absolute position of the tool.

14. The apparatus of claim 1 wherein all of said tools are positioned within a maximum time period on the order of less than two minutes.

15. The apparatus of claim 1 wherein said measuring unit is an absolute position memory sensing unit, said controller establishing periodic communication with each of said boards for monitoring the status of each tool axis, said communication established within each period of execution of said computer processing unit to thereby continuously monitor the status of said processing unit and said tool position relative to all axes, said controller comparing all such information data with the part data for detecting any malfunction with respect to any tool axes positioning and for detecting the establishing of all said tool axes to the final position.

16. The apparatus of claim 1 wherein each of said boards is operable to establish stand alone positioning for a plurality of tools, each of said tools has a plurality of axes, said memory system for at least one of said boards including off-set tables for controlling off-set signal directly without interaction of the controller.

17. The apparatus of claim 1 wherein each of said boards is operable to provide stand alone positioning for a plurality of tools, each of said tools has a plurality of axes.

18. The apparatus of claim 1 wherein each of said board is operable to control at least eight axes of said tool and including eight input-output units, one for each axes, said input-output unit establishing communication between the output of said measuring unit and said motor for driving of said motor in accordance with speed and directional control signals created by said computer processing unit and monitoring the actual position of the tool along the related axes.

19. The apparatus of claim 1 wherein a plurality of identical boards are provided to expand the system for controlling multiples of the axes provided by a first board.

20. A tool position apparatus for a multiple head working machine having at least one work station having a movable part support for moving apart through said work station, comprising a working tool having a support unit adapted to be mounted within said work station and having a plurality of positioning axes for positioning the tool relative to said movable part support and thereby said part, said tool having a rotational axis for tilting of said tool within said work station along a selected radius, an absolute position measuring unit having an output rod member mounted on said support unit adjacent said tool and having a sensing unit moveable along said rod member, said rod member being curved with a radius generally corresponding to said selected radius, said sensing unit connected to said tool and moving along said rod member in accordance with the tilting of said tool and generating a position signal related to the position of said sensing unit along said rod member, and a programmed table identifying the difference between a signal of the actual tilt of said tool and the output of said measuring unit, and a processing circuit having a memory unit including said programmed table and connected to said measuring unit to modify said position signal to the true position signal for all locations of said sensing unit.

* * * * *

UNITED STATES PATENT AND TRADEMARK OFFICE
CERTIFICATE OF CORRECTION

PATENT NO. : 5,430,360
DATED : July 4, 1995
INVENTOR(S) : Bruce C. Rosenthal et al It is certified that error appears in the above-identified patent and that said Letters Patent is hereby corrected as shown below:

Col. 15, line 14, Claim 1, after "upon" insert ---a---;

Col. 16, line 1, Claim 7, delete "engerizing" and substitute therefor ---energizing---.

Signed and Sealed this

Seventeenth Day of October, 1995

Attest:

BRUCE LEHMAN

*Attesting Officer*   *Commissioner of Patents and Trademarks*